(12) United States Patent
McMahon

(10) Patent No.: US 6,558,266 B2
(45) Date of Patent: May 6, 2003

(54) GOLF TRAINING GLASSES

(76) Inventor: Anthony Basil McMahon, 12542 Richard Ave., Palos Heights, IL (US) 68463

( * ) Notice: Subject to any disclaimer, the term of this patent is extended or adjusted under 35 U.S.C. 154(b) by 0 days.

(21) Appl. No.: 09/970,376

(22) Filed: Oct. 3, 2001

(65) Prior Publication Data

US 2002/0137571 A1 Sep. 26, 2002

Related U.S. Application Data

(60) Provisional application No. 60/277,927, filed on Mar. 23, 2001.

(51) Int. Cl.$^7$ ................................................ A63B 69/36
(52) U.S. Cl. ..................... 473/210; 473/268; 351/45; 33/262
(58) Field of Search ................................ 473/210, 227, 473/268; 33/262; 351/45

(56) References Cited

U.S. PATENT DOCUMENTS

| | | | |
|---|---|---|---|
| 1,135,921 A | | 4/1915 | Ramsay |
| 1,169,188 A | | 1/1916 | Peck |
| 1,279,924 A | | 9/1918 | Smith |
| 1,542,648 A | * | 7/1925 | Fletcher |
| 1,564,745 A | | 12/1925 | Amesbury |
| 1,591,523 A | | 7/1926 | Fuller |
| 1,591,524 A | | 7/1926 | Fuller |
| 1,637,406 A | | 8/1927 | Brumder |
| 1,669,457 A | | 5/1928 | Dailey |
| 2,009,700 A | * | 7/1935 | McMurdo |
| 2,045,399 A | | 6/1936 | McMurdo |
| 2,330,442 A | | 9/1943 | Nero |
| 2,611,610 A | | 9/1952 | Hara |
| 2,626,151 A | | 1/1953 | Jenks |
| 2,663,021 A | | 12/1953 | Douglass |
| 2,773,691 A | | 12/1956 | Redfield |

(List continued on next page.)

Primary Examiner—Paul T. Sewell
Assistant Examiner—Nini F. Legesse
(74) Attorney, Agent, or Firm—Greenberg Traurig

(57) ABSTRACT

Golf training glasses to assist a golfer's swing comprising a frame, a pair of lenses associated with the frame and a sight guide associated with each lens. The sight guide includes an upper guide bar and a lower guide bar, wherein the upper and lower guide bars extend from the right side of the lens to the left side of the lens. The upper guide bar is separated at least partially from the lower guide bar to form a shot pathway between the upper and lower guide bars. Moreover, the upper and lower guide bars at least partially converge toward one of the right and left sides of the lens to form a converging shot pathway to focus a shot line of the golfer. Additionally, the sight guide further includes a ball placement locator for positioning of the ball relative to the shot pathway, and foot placement guides to help align a golfer's stance with the ball, the shot pathway and the club path.

20 Claims, 2 Drawing Sheets

U.S. PATENT DOCUMENTS

| | | |
|---|---|---|
| 2,808,267 A | 10/1957 | Heaton |
| 2,809,043 A | 10/1957 | Brouwer |
| 3,228,696 A | 1/1966 | Hull |
| 3,264,002 A * | 8/1966 | Palumbo |
| 3,268,228 A * | 8/1966 | Novack |
| 3,324,851 A | 6/1967 | Posner |
| 3,442,513 A | 5/1969 | Fisher |
| 3,487,549 A * | 1/1970 | Engesser |
| 3,580,584 A * | 5/1971 | Trosko |
| 3,740,051 A | 6/1973 | Cross |
| 3,826,502 A | 7/1974 | Sorge |
| 3,871,104 A * | 3/1975 | Underhill, II |
| 3,951,414 A | 4/1976 | Nunez |
| 4,000,905 A * | 1/1977 | Shirhall |
| 4,022,475 A | 5/1977 | Todd |
| 4,045,033 A | 8/1977 | Schuman |
| 4,058,852 A | 11/1977 | Aragona |
| D246,655 S * | 12/1977 | Van Horn et al. |
| 4,063,740 A | 12/1977 | Mader |
| 4,079,940 A | 3/1978 | Arakaki |
| 4,251,076 A * | 2/1981 | Krupicka |
| 4,307,885 A | 12/1981 | Pidcock |
| 4,318,546 A | 3/1982 | Chen |
| 4,359,221 A | 11/1982 | Taylor |
| 4,422,643 A | 12/1983 | Cushing |
| 4,479,653 A | 10/1984 | Woodson |
| 4,531,743 A * | 7/1985 | Lott |
| 4,593,909 A | 6/1986 | Anselmo et al. |
| 4,662,640 A | 5/1987 | Grander |
| 4,688,800 A | 8/1987 | Lopez |
| 4,696,111 A * | 9/1987 | Gardner |
| 4,739,991 A | 4/1988 | Flinn, Jr. |
| 4,762,325 A | 8/1988 | McCleery |
| 4,789,159 A | 12/1988 | Kane |
| 4,799,675 A | 1/1989 | Helmer |
| 4,824,234 A * | 4/1989 | Sparks et al. |
| 4,852,881 A | 8/1989 | Bellagamba et al. |
| 4,852,882 A | 8/1989 | Otsuka et al. |
| 4,880,240 A | 11/1989 | Lewis |
| 4,883,276 A | 11/1989 | Brown |
| 4,896,375 A | 1/1990 | Colucci |
| 4,915,387 A * | 4/1990 | Baxstrom |
| 4,949,974 A | 8/1990 | Bellagamba |
| 4,957,295 A | 9/1990 | McConkey |
| 4,969,649 A | 11/1990 | Lugiewicz |
| 4,991,849 A * | 2/1991 | Fabanich |
| 5,026,065 A | 6/1991 | Bellagamba |
| 5,048,836 A | 9/1991 | Bellagamba |
| 5,050,885 A | 9/1991 | Ballard et al. |
| 5,060,942 A | 10/1991 | Dalbo |
| 5,062,642 A | 11/1991 | Berry et al. |
| 5,064,198 A | 11/1991 | Szabo |
| 5,096,199 A | 3/1992 | Wyatt, Jr. et al. |
| 5,149,099 A | 9/1992 | Radakovich |
| 5,150,901 A | 9/1992 | Stawicki |
| 5,154,416 A | 10/1992 | Smull et al. |
| 5,163,686 A * | 11/1992 | Bergman |
| 5,171,152 A | 12/1992 | McCleery |
| 5,177,510 A * | 1/1993 | Peters et al. |
| 5,188,365 A | 2/1993 | Picard |
| 5,209,482 A | 5/1993 | Hopfer |
| 5,221,089 A | 6/1993 | Barrett |
| 5,253,870 A | 10/1993 | Bedney |
| 5,257,779 A | 11/1993 | Dalbo |
| 5,284,345 A | 2/1994 | Jehn |
| 5,308,071 A | 5/1994 | Lewis |
| 5,362,060 A * | 11/1994 | Hinson |
| 5,390,929 A | 2/1995 | Todaro |
| 5,413,346 A | 5/1995 | Hedlund et al. |
| 5,439,214 A | 8/1995 | Dalbo |
| 5,441,271 A | 8/1995 | Briggs |
| 5,444,501 A | 8/1995 | Aloi et al. |
| 5,467,992 A | 11/1995 | Harkness |
| 5,470,073 A | 11/1995 | Vasquez |
| 5,478,081 A * | 12/1995 | Terry |
| 5,489,953 A * | 2/1996 | Griffith |
| 5,501,464 A | 3/1996 | Dalbo |
| 5,529,306 A | 6/1996 | Staats et al. |
| 5,538,250 A | 7/1996 | Putz |
| 5,569,095 A | 10/1996 | McCollum |
| 5,658,203 A | 8/1997 | Shub |
| 5,682,220 A * | 10/1997 | Sherman et al. |
| 5,690,494 A | 11/1997 | Luker |
| 5,722,898 A | 3/1998 | Witten |
| 5,752,887 A | 5/1998 | Baldwin, IV |
| 5,785,603 A | 7/1998 | Lazier |
| 5,795,238 A | 8/1998 | Nicholson |
| 5,800,278 A | 9/1998 | Varriano |
| 5,803,822 A | 9/1998 | Pursell |
| 5,839,968 A | 11/1998 | Latella |
| 5,846,143 A | 12/1998 | Brock et al. |
| 5,879,239 A | 3/1999 | Macroglou |
| 5,879,240 A | 3/1999 | Stuart |
| 5,890,968 A | 4/1999 | Mingo |
| 5,997,408 A | 12/1999 | Bankhead |
| 6,077,168 A * | 6/2000 | Huang |
| 6,126,554 A | 10/2000 | Poscente |
| 6,129,638 A | 10/2000 | Davis |
| 6,132,322 A | 10/2000 | Bonham |
| 6,165,079 A | 12/2000 | Czaja |
| 6,176,790 B1 | 1/2001 | Latella |

* cited by examiner

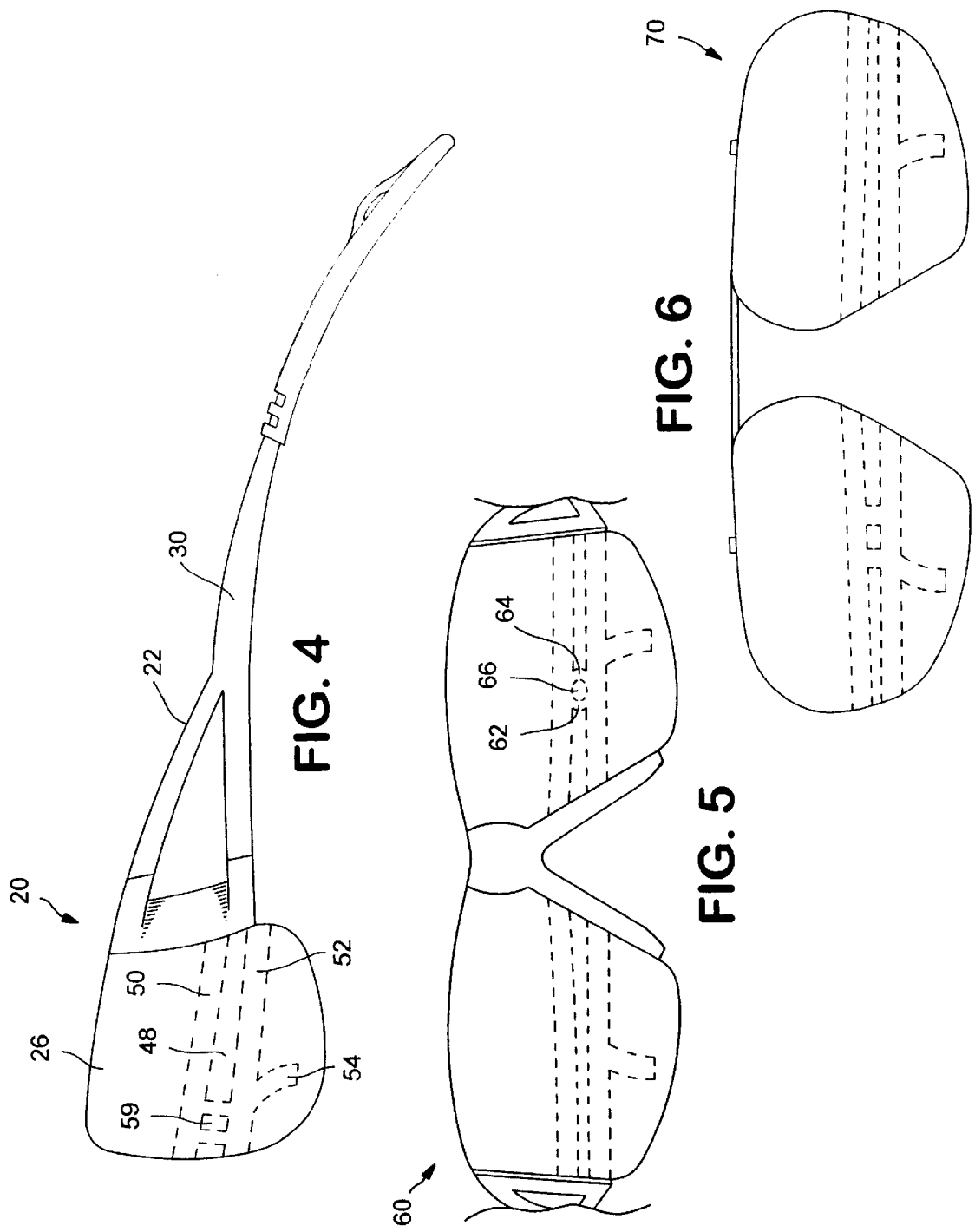

GOLF TRAINING GLASSES

The present application is based upon a provisional application, serial No. 60/277,927, filed Mar. 23, 2001.

BACKGROUND OF THE INVENTION

1. Field of the Invention

The present invention relates in general to golf swing aids and, more particularly, to golf training glasses particularly designed to improve a golfer's putting stroke and a golfer's swing.

2. Background Art

Devices to help golfers improve their swing have been known in the art for years. In particular, many of these devices have taken the form of spectacles or glasses to be worn by a golfer. These glasses or spectacles are generally designed to minimize head movement during a golf swing, maintain the alignment of a golfer's body during a swing, provide a shot line, or a combination thereof.

For instance, each of Fabanich, U.S. Pat. No. 4,991,849, Palumbo, U.S. Pat. No. 3,264,002 and McMurdo, U.S. Pat. No. 2,009,700 are directed to eyeglasses for use as golf training devices having one or more horizontal lines extending across at least a portion of the lenses for defining a visual path from the ball to the hole. Fabanich further includes a small gap in one of those horizontal lines in which to locate the ball, and a sight guide which may be adjusted between positions closer to and farther from a golfer's eyes. In contrast, Palumbo includes an extension bar which attaches to the frame of a pair of glasses for visual alignment of the ball with a target.

Other prior art golf training glasses, including Engesser, U.S. Pat. No. 3,487,549, Underhill, II, U.S. Pat. No. 3,871,104, Krupicka, U.S. Pat. No. 4,251,076 and Griffith, U.S. Pat. No. 5,489,953, disclose eyeglasses having one or more horizontal lines extending across at least a portion of one of the lenses, and one or more vertical elements positioned proximate the horizontal lines in at least one lens. The combination of the vertical and horizontal elements allows alignment of a target, such as ball, in the cross hairs. Further, the vertical portion may function to help a golfer align a golf club such as a putter, while the horizontal line may be provide a guide for the ball path.

While these and other prior art devices have worked well, it is desirable to provide an improved pair of golf training glasses to help shave strokes off of a golfer's game. In particular, while prior devices have provided cross hairs for location of a ball and a horizontal line to assist in locating a ball path, none of these prior art references have provided a method by which a golfer can also align his or her feet in relationship to the club head and the ball. Foot alignment is important as a golf stroke, and more particularly a putting stroke, requires balance and proper weight distribution. Thus, it is a goal to provide proper alignment of a golfer's feet with the initial location of the ball and the desired path of the ball.

Moreover, and it is likewise desired to provide a horizontal ball path which helps focus a golfer more clearly on the path of the ball toward a target. To this end, it is desirable to provide a path defined by lines or bars which leads to a desired target, such as a golf hole.

Further, inasmuch as straight horizontal parallel lines tend to diverge when viewed through spectacles toward a point in the distance, it is likewise desired to provide converging lines to provide a uniform ball pathway extending from a ball placement location to a target—to assist a golfer in lining up a shot, and maintaining his or her head still during club take back and ball striking.

These and other desirous characteristics of the present invention will become apparent in light of the present specification (including claims) and drawings.

SUMMARY OF THE INVENTION

The present invention is directed to golf training glasses to assist a golfer's swing, and particularly a golfer's putting game. The golf training glasses comprise a frame, a pair of lenses associated with the frame and a sight guide associated with each lens. The sight guide includes an upper guide bar and a lower guide bar, wherein the upper and lower guide bars extend from the inner portion of the lens to the outer portion of the lens. In a preferred embodiment, the upper and lower guide bars are oriented substantially horizontally. The upper guide bar is separated at least partially from the lower guide bar to form a shot pathway between the upper and lower guide bars.

In a preferred embodiment, the upper and lower guide bars at least partially converge toward one of the right and left sides of the lens to form a converging shot pathway to focus the shot line of a golfer. The converging upper and lower guide bars preferably compensate for distance distortion and create a substantially uniform shot pathway from the ball to an intended target.

The sight guide further includes a ball placement locator for positioning of the ball relative to the shot pathway. In one preferred embodiment, the ball placement locator includes two vertical bars which form a substantially rectangular ball positioning window. One of the vertical bars may further include a club alignment edge for squaring a club relative to the ball and the shot pathway. In another preferred embodiment, the ball placement locator includes substantially rounded bars to form a substantially rounded ball positioning window.

The sight guide also preferably includes a pair of foot placement guides to help align a golfer's stance with the ball, the shot pathway and the club path. The foot placement guides preferably extend substantially downward from the lower guide bar in each lens, and are preferably contoured to match a golfer's shoes.

In a preferred embodiment, the ball placement locator bars and ball placement window are positioned in one lens to accommodate a right-handed golfer. In another preferred embodiment, the ball placement window is reversed to accommodate a left-handed golfer.

The golf training glasses may comprise a pair of sunglasses, a pair of prescription glasses or a pair of clip-ons. Moreover, the sight guide may be printed, etched, painted or stuck onto the inside surface of the lenses. Alternatively, the sight guide may be placed on the outer surface of the lenses, or may be attached to the glasses if the sight guide includes a separate piece which is attachable to preexisting glasses.

BRIEF DESCRIPTION OF THE DRAWINGS

FIG. 4 is a side elevational view of the golf training glasses shown in FIG. 1;

FIG. 5 is a partial front elevational view of the golf training glasses according to another embodiment of the present invention; and FIG. 6 is a partial front elevational view of a pair of clip-on lenses according to another embodiment of the present invention.

DETAILED DESCRIPTION OF THE INVENTION

Figure 1:
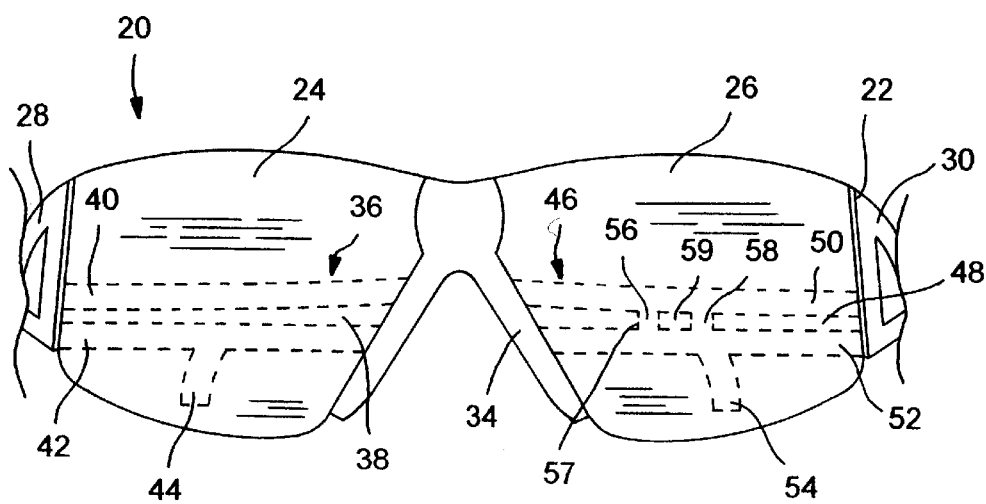
FIG. 1 is a partial front elevational view looking at the outside of the lenses of the golf training glasses according to one embodiment of the present invention.

While this invention is susceptible of embodiment in many different forms, there are shown in the drawings and will be described in detail in several specific embodiments with the understanding that the present disclosure is to be considered as an exemplification of the principals of the invention and it is not intended to limit the invention to the embodiments illustrated.

Golf training glasses 20 are shown in FIGS. 1–4 as comprising frame 22, first lens 24 and second lens 26. At the outset, while golf training glasses 20 are shown in the drawings as comprising a pair of sunglasses, it is likewise contemplated that the golf training glasses may take the form of a pair clear spectacles, or even prescription glasses. Indeed, the sight guides which will be described below may be incorporated directly into either or both of the first 24 and second 26 lenses, or may be housed in a member which is attachable to a pair of glasses. For instance, the sight guide may be a frame which extends from the frame of the glasses. Moreover, the golf training glasses may be customized for a particular person, in either clear glasses or tinted sunglasses for protection against the sun, both in terms of the prescription of the lenses, as well as the particular dimensions and location of the sight guide. Additionally, throughout this description, like reference numerals will be used to designate like parts.

Frame 22, shown in FIGS. 1–4, includes arms 28 and 30, brow bar 32, and nose rest 34. Arms 28 and 30 connect to brow bar 32 at a hinge, such that the arms can fold inwardly for storage of glasses 20, as is well known in the art. Moreover, while nose rest 34 is shown as having a substantially soft rubber inside portion to increase comfort, virtually any nose rest known in the spectacle art can be used with the present invention. Indeed, the particular design of the arms, brow bar and nose rest, as well as the shape of the lenses, can be modified to accommodate or suit any desirable design.

Figure 2:
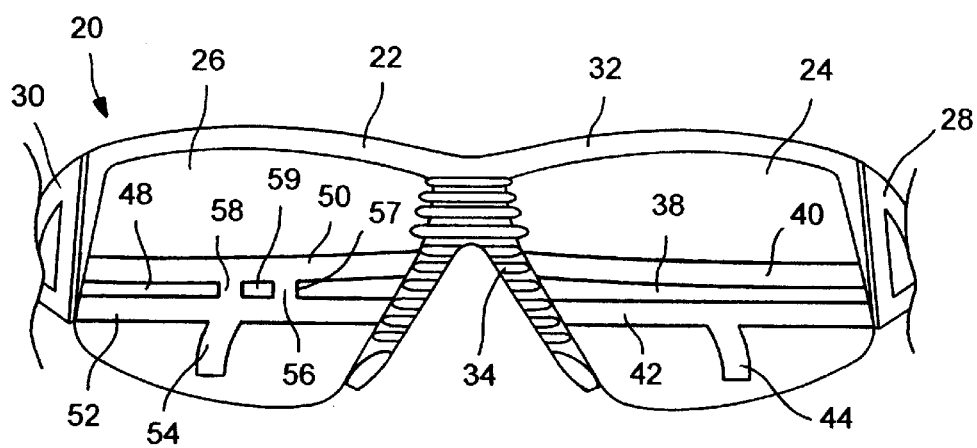
FIG. 2 is a rear elevational view looking at the inside of the lenses of the golf training glasses shown in FIG. 1.
Figure 3:
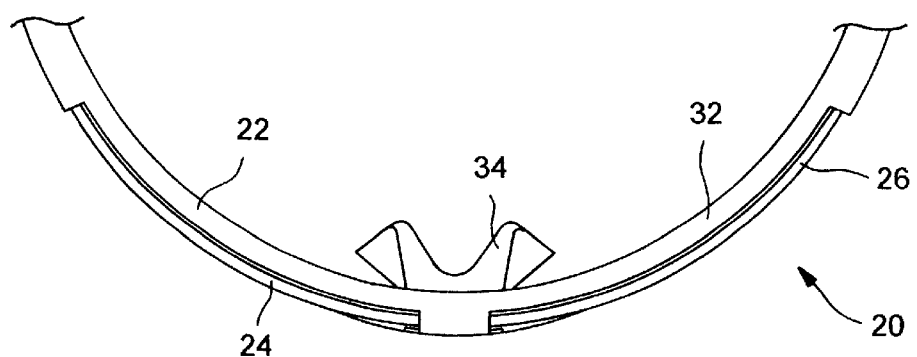
FIG. 3 is a partial top plan view of the golf training glasses shown in FIG. 1.

First lens 24, shown in FIGS. 1–3, includes sight guide 36 and shot pathway 38. Sight guide 36 includes upper guide bar 40, lower guide bar 42 and foot placement guide 44. As is shown in FIGS. 1 and 2, sight guide 36 is preferably printed onto the inside surface of lens 24, such as by a pad printing process. Moreover, upper guide bar 40, lower guide bar 42 and foot placement guide 44 are preferably shown as black lines, to create a contrast with the remainder of first lens 24. However, it is likewise contemplated that sight guide 36 is associated with first lens 24 in any number of different manners, such as by etching, other printing processes, stickers, paint or other manners as would be known by those in the art with the present disclosure before them.

Moreover, depending on the tint of the lens, sight guide 36 could also take any number of different colors, as long as sight guide 36 is still viewable by a golfer through the inside of first lens 24. Notably, it is unnecessary that sight guide 36 is viewable or distinguishable from outside of the first lens 24 and second lens 26 of the golf training glasses. It is also contemplated that the sight guide may be printed or otherwise associated with the golf training glasses on the outside surfaces of the lenses, rather than or in addition to the inside surfaces.

Upper guide bar 40 and lower guide bar 42, shown in FIGS. 1 and 2, are preferably substantially horizontal lines extending from the inner portion of lens 24 to the outer portion of lens 24. Upper guide bar 40 and lower guide bar 42 preferably have a width, and are separated from one another to define shot pathway 38. Notably, it is preferred that upper guide bar 40 is not completely parallel to lower guide bar 42. Instead, upper guide bar 40 and lower guide bar 42 preferably converge as they extend from the inner portion of lens 24 toward the outer portion of lens 24. As a result, shot pathway 38 also converges as it extends from the inner portion of lens 24 toward the outer portion of lens 24, to better focus the path and direction of a golf shot. In particular, when a golfer views a shot line from the ball to a target through sight guide 36 (in a putt, for instance, the shot line would extend from the ball to the cup), the target is a selected distance away from the location of the ball in a golfer's stance. That distance causes upper and lower guide bars 40 and 42, if parallel, to appear to a golfer to widen or diverge toward the outer portion of the lens. A converging shot pathway, such as shot pathway 38, accounts for this distance distortion and provides a golfer with a relatively uniform shot pathway to help line up a golf shot.

However, it is contemplated that upper guide bar 40 and lower guide bar 42 may comprise parallel bars or lines, if such a design is desired by a golfer. Moreover, upper guide bar 40 and lower guide bar 42 may also be designed with an increased convergence, to actually limit the shot pathway 38 even further toward the outer portion of the lens—to further focus the line of a golf shot. Moreover, while upper guide bar 40 and lower guide bar 42 are shown as spanning the entire width of first lens 24, they need not extend to the outer edges of the lens.

Upper guide bar 40 and lower guide bar 42 are also shown as having a thickness. The bars help direct a golfer's focus to the clear lens between the guide bars (the shot pathway 38), without forcing the golfer to follow a solid line. Thus, a golfer can follow a ball path and a swing path through a clear portion of the lens. Of course, either or both the upper and lower guide bars may comprise thinner bars, thicker bars, or simple lines. Further, sight guide 36 may be adjusted up or down on first lens 24 to accommodate different golfers, different swings, different clubs or different design objectives.

Foot placement guide 44 is shown as a hash mark extending substantially downward from lower guide bar 42. Foot placement guide 44 is preferably curved or rounded, to match the contour of a golfer's foot and/or shoe. As will be discussed below, the combination of foot placement guides 44 and 54 helps align a golfer's stance relative to the ball and the club to assist the golfer in focusing on a shot, without moving his or her head during club take back or ball striking. Like the other components of sight guide 36, foot placement guide 44 may be adjusted on lens 24—such as along lower guide bar 42. Additionally, foot placement guide may also be adjusted in size or length, to accommodate a particular golfer or design.

Second lens 26, shown in FIGS. 1, 2 and 4, includes sight guide 46 and shot pathway 48. Much like sight guide 36 on the first lens 24, sight guide 46 on second lens 26 includes upper guide bar 50, lower guide bar 52 and foot placement guide 54. Moreover, also like the upper and lower guide bars on first lens, upper guide bar 50 and lower guide bar 52 preferably converge as they extend from the inner portion of second lens 26 to the outer portion of second lens 26 to account for the distance distortion a golfer encounters in lining up a shot. However, second lens 26 also includes ball placement locator guide bars 56 and 58, which define ball placement window 59. In particular, ball placement locator guide bars 56 and 58 are substantially vertical segments extending between upper guide bar 50 and lower guide bar 52 to assist a golfer in positioning the ball relative to shot pathway 48 and his or her feet, as located by foot placement guides 54 and 44. Thus, as shown in FIGS. 1 and 2, ball placement locator guide bars 56 and 58 define a ball placement window 59 positioned toward the front of a right-handed golfer's stance—a ball position typically suitable for putting, woods and longer irons. However, ball placement window may be located at different positions between upper guide bar 50 and lower guide bar 52, depending on golfer preference, as well as club selection.

Additionally, ball placement locator guide bar 56 further includes club alignment edge 57. The vertical nature of ball placement locator guide bar 58 allows the golfer to line up a club, such as a putter typically having a straight edge, directly behind the ball such that it is square to shot pathway 48. This helps a golfer line up the ball not only relative to his or her feet, but also relative to the club.

Of course, while ball placement locator guide bars 56 and 58 are likewise shown as bars having a thickness, they may likewise have differing thicknesses or comprise simple lines. Further, it is also contemplated that sight guide 46 in second lens 26 may include only one ball placement locator guide bar, which may be used for alignment of the ball as well as a golf club.

Notably, lenses 24 and 26 are preferably easily removable from frame 22, such as by a simple snap-in and snap-out mechanism. This permits various modifications to the sight guides in both of the lenses to suit a particular golfer's preferences, such as ball placement preferences, foot placement preferences and right- or left-handedness. The lenses can be easily interchanged with other lenses to suit different golfers, different club selections and/or different shots.

In practice, when golf training glasses 20 are worn by a golfer during the preparation for and execution of a golf shot, the training glasses help force a golfer to keep his or her head still during a golf shot. Moreover, the training glasses help keep proper body and club alignment during the shot. In particular, a golfer lines up his or her feet relative to foot placement guides 44 and 54, while lining up the ball inside ball placement window 59. The golfer then preferably aligns a selected club with the club alignment edge 57. During the club take back, the golfer ensures that his or her head is still, such that the club first follows shot pathway 48 in second lens 26, and then shot pathway 38 in first lens 24—which acts as a club pathway for the particular sight guide employed by glasses 20. During the shot, the golfer makes sure that the ball remains in ball placement window 59 while the club, such as a putter, preferably remains substantially perpendicular to the upper and lower guide bars on both first lens 24 and second lens 26. At the same time, the golfer ensures that shot pathway 48 is directed to the target, such as a hole, so that the golfer has the proper shot line.

Of course, variations in the golf training glasses are likewise contemplated. For instance, as shown in FIG. 5, the sight guides in the first and second lenses may be reversed for a left-handed golfer. Additionally, instead of a square ball placement window, ball placement locator guide bars 62 and 64 are shown in FIG. 5 as having a rounded shape, to form a rounded ball placement window 66 to more substantially match the shape of the ball.

In an another embodiment, shown in FIG. 6, the sight guides may be located in two lenses 70 which clip on to a pair of standard glasses. This allows those golfers who require corrected vision to simply place a pair of clear or tinted clip-on lenses over their normal spectacles.

It is also contemplated, although not shown in the drawings, that the golf training glasses may include a single, unitary lens which houses a single sight guide. Thus, instead of having two separate lenses, the glasses, particularly sunglasses, may be made with a single lens as is well known in the art.

It is further contemplated that any portion of the sight guide on the lenses may be adjustable. One such manner is to provide a different sticker for application to the lenses. Another contemplated method is to provide portions of the sight guide, such as the foot placement guides or the ball placement locator guides, as attachable members, such as stickers or glue-on pieces to allow a user to adjust the ball positioning and foot positioning with the same pair of glasses. Additionally, the sight guide may be implemented with a grid over the glasses, which grid may be scrolled up and down, or left and right along the lenses to allow adjustment of the upper and lower guide bars, foot placement guides and/or ball placement locator guide bars. This may be particularly effective for golfers who prefer different ball locations in their stance with different club selections.

The foregoing description and drawings merely explain and illustrate the invention, and the invention is not limited thereto, except insofar as the appended claims are so limited as those skilled in the art having the present disclosure before them will be able to make modifications and variations therein without departing from the scope of the invention.

What is claimed is:

1. A visual swing aid to be worn by a golfer comprising:
a frame for wearing on the head of a user;
at least one lens associated with the frame, the at least one lens including a top side, a bottom side, a left side and an opposing right side;
the at least one lens including a sight guide having an upper guide bar and a lower guide bar,
the upper and lower guide bars extending from the right side of the lens to the left side of the lens,
the upper guide bar being separated at least partially from the lower guide bar to form a shot pathway between the upper and lower guide bars, wherein the upper and lower guide bars at least partially converge toward one of the right and left sides of the lens to form a converging shot pathway to focus a shot line of the golfer.

2. The swing aid according to claim 1 wherein the upper and lower guide bars are oriented substantially horizontally.

3. The swing aid according to claim 1 wherein the sight guide further includes a ball placement locator for positioning the ball relative to the upper and lower guide bars.

4. The swing aid according to claim 3 wherein the ball placement locator includes at least one guide positioned between the upper and lower guide bars.

5. The swing aid according to claim 4 wherein the at least one ball placement locator guide is a bar oriented substantially vertically to facilitate placement of a golf ball in the shot pathway between the upper and lower guide bars.

6. The swing aid according to claim 5 wherein the ball placement locator guide bar includes at least one club alignment edge for properly aligning a golf club head relative to the ball.

7. The swing aid according to claim 5 wherein the ball placement locator guide includes at least two substantially vertical lines positioned between the upper and lower guide bars to form a ball placement window.

8. The swing aid according to claim 3 wherein the ball placement locator includes a substantially rounded ball placement window to facilitate placement of a golf ball in the shot pathway.

9. The swing aid according to claim 1 wherein the at least one lens further includes at least one foot placement guide for aligning at least one foot of a golfer relative to the shot pathway.

10. The swing aid according to claim 9 wherein the at least one foot placement guide includes at least one vertical bar segment extending substantially downward from the lower guide bar of the sight guide.

11. The swing aid according to claim 10 wherein the at least one vertical bar segment substantially matches at least a portion of the contour of a golfer's shoe.

12. The swing aid according to claim 10 wherein each lens further includes at least one foot placement guide for aligning a golfer's feet relative to the shot pathway.

13. The swing aid according to claim 1 including two lenses associated with the frame, wherein each lens includes a top side, a bottom side, a left side and an opposing right side;

each lens includes a sight guide having an upper guide bar and a lower guide bar, the upper and lower guide bars on each lens extend from the right side of the lens to the left side of the lens;

the upper guide bar is separated at least partially from the lower guide bar to form a shot pathway between the upper and lower guide bars in both lenses, and wherein the upper and lower guide bars at least partially converge toward one of the first and second sides of each lens to form a converging shot pathway in each lens to focus a shot line of the golfer.

14. The swing aid according to claim 13 wherein the shot pathway in one of the lenses forms a golf club swing path.

15. The swing aid according to claim 13 wherein one of the two lenses includes a ball placement locator for positioning the ball relative to the upper and lower guide lines/bars.

16. The swing aid according to claim 1 wherein the at least one lens is mounted to the frame.

17. The swing aid according to claim 1 wherein the at least one lens is removable from the frame to allow for replacement by a lens with a different sight guide.

18. The swing aid according to claim 1 wherein the at least one lens attaches over a golfer's prescription glasses.

19. The swing aid according to claim 1 wherein the at least one lens is tinted for protection against the sun.

20. A visual swing aid to be worn by a golfer comprising:

a frame for wearing on the head of a user;

at least one lens associated with the frame;

the at least one lens including a top side, a bottom side, a left side and an opposing right side;

the at least one lens including a sight guide having an upper guide bar and a lower guide bar, the upper and lower guide bars extending from the right side of the lens to the left side of the lens, the upper guide bar being separated at least partially from the lower guide bar to form a shot pathway between the upper and lower guide bars, and the at least one lens including at least one foot placement guide for aligning at least one foot of a golfer relative to the shot pathway.

* * * * *